US012509427B2

(12) United States Patent
Pou et al.

(10) Patent No.: US 12,509,427 B2
(45) Date of Patent: Dec. 30, 2025

(54) INTERMEDIATES AND SYNTHESIS FOR ENDOCHIN-LIKE QUINOLONE COMPOUNDS

(71) Applicants: Oregon Health & Science University, Portland, OR (US); The United States Government as Represented by the Department of Veterans Affairs, Washington, DC (US)

(72) Inventors: Sovitj Pou, Portland, OR (US); Rolf W. Winter, Portland, OR (US); Michael K. Riscoe, Portland, OR (US); J. Stone Doggett, Portland, OR (US); Aaron Nilsen, Portland, OR (US)

(73) Assignees: Oregon Health & Science University, Portland, OR (US); The United States Government as Represented by the Department of Veterans Affairs, Washington, DC (US)

( * ) Notice: Subject to any disclaimer, the term of this patent is extended or adjusted under 35 U.S.C. 154(b) by 516 days.

(21) Appl. No.: 17/998,018

(22) PCT Filed: May 10, 2021

(86) PCT No.: PCT/US2021/031651
§ 371 (c)(1),
(2) Date: Nov. 4, 2022

(87) PCT Pub. No.: WO2021/231335
PCT Pub. Date: Nov. 18, 2021

(65) Prior Publication Data
US 2023/0167065 A1    Jun. 1, 2023

Related U.S. Application Data

(60) Provisional application No. 63/023,166, filed on May 11, 2020.

(51) Int. Cl.
*C07D 215/233*    (2006.01)

(52) U.S. Cl.
CPC ................. *C07D 215/233* (2013.01)

(58) Field of Classification Search
CPC ................................................. C07D 215/233
See application file for complete search history.

(56) References Cited

U.S. PATENT DOCUMENTS

| 8,598,354 B2 | 12/2013 | Riscoe et al. |
| 9,163,008 B2 | 10/2015 | Ni et al. |
| 2014/0045888 A1 | 2/2014 | Riscoe et al. |
| 2019/0031613 A1 | 1/2019 | Manetsch et al. |
| 2019/0202766 A1 | 7/2019 | Andahazy et al. |
| 2020/0283391 A1 | 9/2020 | McLeod et al. |

FOREIGN PATENT DOCUMENTS

WO    WO2017112678 A1    6/2017

OTHER PUBLICATIONS

Nilsen et al., Discovery, Synthesis, and Optimization of Antimalarial 4(1H)-Quinolone-3-Diarylethers, 57(9) J. Med. Chem. 3818-3834 (2014) (Year: 2014).*
Alday, et al. "Genetic Evidence for Cytochrome b Qi Site Inhibition by 4(1H)-Quinolone-3- Diarylethers and Antimycin in Toxoplasma gondii," Antimicrobial Agents and Chemotherapy, vol. 61, No. 2, e01866-16, Dec. 2016, 8 pages.
Cross, et al., "Orally Bioavailable 6-Chloro-7-methoxy-4(1H)-quinolones Efficacious against Multiple Stages of Plasmodium," Journal of Medicinal Chemistry, vol. 57, Aug. 2014, pp. 8860-8879.
Lawres, et al., "Radical Cure of Experimental Babesiosis in Immunodeficient Mice Using a Combination of an Endochin-like Quinolone and Atovaquone," The Journal of Experimental Medicine, vol. 213, No. 7, 2016, pp. 1307-1318.
Monastyrskyi, et al., "Metal-Free Arylation of Ethyl Acetoacetate with Hypervalent Diaryliodonium Salts: An Immediate Access to Diverse 3-Aryl-4(1H)-Quinolones," The Journal of Organic Chemistry, vol. 80, Jan. 2015, pp. 2513-2520.
Namelikonda, et al., "Scalable Multigram Syntheses of Antimalarial 4(1H)-Quinolones ELQ-300 and P4Q-391," European Journal of Organic Chemistry, 2017, pp. 3328-3334.
Nilsen, et al., "Quinolone-3-Diarylethers: A New Class of Drugs for a New Era of Malaria Eradication," Sci Transl Med., vol. 5, No. 177, Mar. 2013, 177ra37, 25 pages.
Pidathala, et al., "Identification, Design and Biological Evaluation of Bisaryl Quinolones Targeting Plasmodium falciparum Type Ii Nadh: Quinone Oxidoreductase (PfNDH2)", Journal of Medical Chemistry, vol. 55, No. 5, Feb. 2012, pp. 1831-1843.
Song, et al., "The Antimalarial Compound ELQ-400 is an Unusual Inhibitor of the bc1 Complex, Targeting Both Qo and Qi Sites," FEBS Letters, vol. 592, Mar. 2018, pp. 1346-1356.
Search Report for European Application No. 21804723.1, Dated Apr. 22, 2024, 8 pages.
Stickles, et al., "Subtle Changes in Endochin-Like Quinolone Structure Alter the Site of Inhibition within the Cytochrome bc1 Complex of Plasmodium falciparum," Antimicrobial Agents and Chemotherapy, vol. 59, No. 4, Apr. 2015, 1977-1982.

* cited by examiner

*Primary Examiner* — Timothy R Rozof
(74) *Attorney, Agent, or Firm* — Lee & Hayes, P.C.

(57) ABSTRACT

The present invention provides synthetic methods and novel intermediates in the preparation of 3-aryl Endochin-like quinolone (ELQ) compounds.

20 Claims, No Drawings

INTERMEDIATES AND SYNTHESIS FOR ENDOCHIN-LIKE QUINOLONE COMPOUNDS

CROSS REFERENCE TO RELATED APPLICATION

This is the 371 National Phase of co-pending international application No. PCT/US2021/031651, filed May 10, 2021, which claims priority to and the benefit of the earlier filing date of U.S. Provisional Application No. 63/023,166, filed on May 11, 2020, which is incorporated by reference herein in its entirety.

GOVERNMENT SUPPORT

This invention was made with government support under R01 AI100569 and R01 A1141412 awarded by the National Institutes of Health, and W81XWH-19-2-0031 awarded by the Department of Defense. The government has certain rights in the invention.

FIELD OF THE INVENTION

The present invention provides synthetic methods and novel intermediates in the preparation of 3-aryl Endochin-like quinolone (ELQ) compounds.

BACKGROUND OF THE INVENTION

Endochin-like quinolone (ELQ) compounds have been developed for the treatment of diseases caused by organisms of the phylum Apicomplexa include malaria, toxoplasmosis and coccidiosis.

Methods of preparing ELQ compounds, including ELQ-316, are provided in U.S. Pat. No. 8,598,354 (Riscoe et al.) and the articles: *Quinolone-3-Diarylethers: A new class of drugs for a new era of malaria eradication*, Nilsen et al., Science Translational Medicine 5, 177ra37 (2013). PMCID: PMC4227885; and *Discovery, Synthesis and Optimization of Antimalarial 4(1H)-Quinolone-3-Diarylethers*, Nilsen et al., J. Med. Chem. 57(9): 3818-34. (2014) doi: 10.1021/jm500147k. (2014) PubMed PMID: 24720377; PMCID: PMC4018401.

There remains a need for additional chemical routes to ELQ compounds, particularly those adaptable to large scale industrial synthesis.

SUMMARY OF THE INVENTION

The present invention provides synthetic methods and novel intermediates in the preparation of 3-aryl Endochin-like quinolone (ELQ) compounds, particularly including 6-chloro-7-methoxy-2-methyl-3-(4-(4-(trifluoromethoxy)phenoxy)phenyl)quinolin-4(1H)-one (ELQ-300) and 6-fluoro-7-methoxy-2-methyl-3-(4-(4-(trifluoromethoxy)phenoxy)phenyl) quinolin-4(1H)-one (ELQ-316) that are amenable to industrial scale-up production.

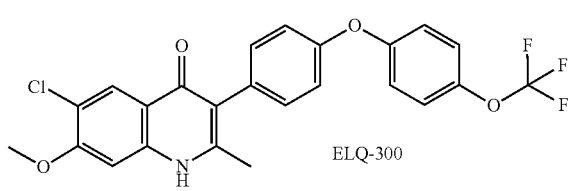

ELQ-300

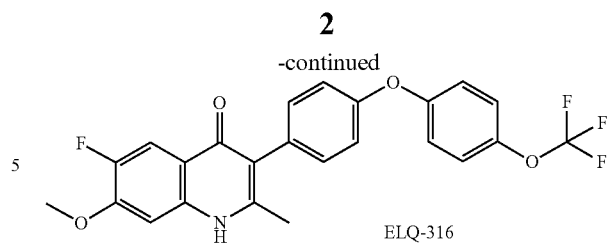

ELQ-316

Provided herein are methods of preparation of a compound of the Formula (A):

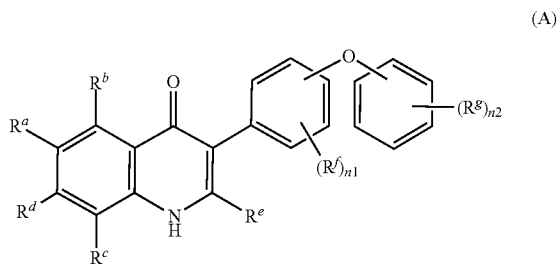

(A)

wherein:

$R^a$, $R^b$, $R^c$, and $R^d$ are each independently selected from the group of H, halogen, $C_1$-$C_6$ alkyl, $C_1$-$C_6$ alkoxy, $C_1$-$C_3$ haloalkyl, aryl, nitro, cyano, amino, amido, acyl, carboxyl, substituted carboxyl, and —$SO_2R^h$;

$R^h$ is selected from the group of H, $C_1$-$C_6$ alkyl, amino, or $C_1$-$C_3$ haloalkyl;

$R^e$ is selected from the group of methyl, $C_1$-$C_3$ haloalkyl, and heteroaryl;

$R^f$ and $R^g$ are independently selected from the group of H, $C_1$-$C_6$ alkyl, $C_1$-$C_6$ alkoxy, $C_1$-$C_3$ haloalkyl, $C_1$-$C_3$ haloalkoxy, methylsulfonyl, and halogen;

n1 is integer selected from the group of 0, 1, 2, 3, 4, and 5; and n2 is integer selected from the group of 0, 1, 2, 3, 4, and 5.

the method comprising the steps of:

a) reacting a compound of Formula (1):

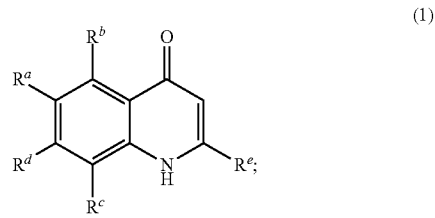

(1)

wherein variables $R^a$, $R^b$, $R^c$, $R^d$, and $R^e$ are as defined for Formula (A), above, with iodine or bromine to produce a compound of Formula (2):

(2)

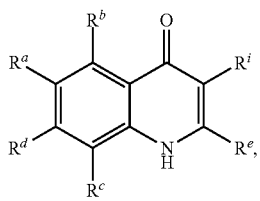

wherein variables $R^a$, $R^b$, $R^c$, $R^d$, and $R^e$ are as defined for Formula (A), above, and $R^i$ is selected from the group of Br and I;

b) reacting the compound of Formula (2) with phosphorous oxychloride (also referred to as phosphoryl chloride) and dichloromethane to produce a compound of Formula (3):

(3)

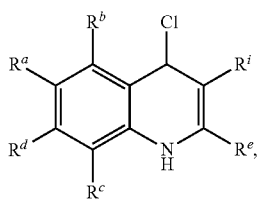

wherein variables $R^a$, $R^b$, $R^c$, $R^d$, and $R^e$ are as defined for Formula (A), above, $R^i$ is selected from Br and I;

c) reacting the compound of Formula (3) with an optionally substituted 4,4,5,5-tetramethyl-2-(4-phenoxyphenyl)-1,3,2-dioxaborolane compound of the formula:

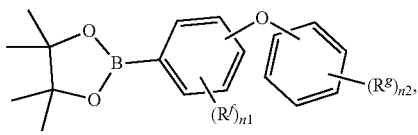

wherein $R^f$, $R^g$, n1, and n2 are as defined for Formula (A), above; in the presence of a palladium catalyst to produce a compound of Formula (4):

(4)

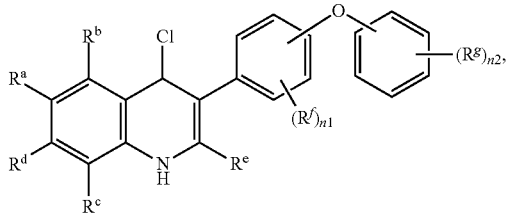

wherein variables $R^a$, $R^b$, $R^c$, $R^d$, $R^e$, $R^f$, R9, n1, and n2 are as defined for Formula (A), above; and d) reacting the compound of Formula (4) with cesium acetate and glacial acetic acid to produce a compound of Formula (A).

Also provided herein are separate methods, each comprising an individual reaction in the scheme above.

DETAILED DESCRIPTION OF THE INVENTION

It is understood that, in separate embodiments, the optionally substituted 4,4,5,5-tetramethyl-2-(4-phenoxyphenyl)-1,3,2-dioxaborolane compound used in the methods herein may be independently selected in each instance from those of the following formulas:

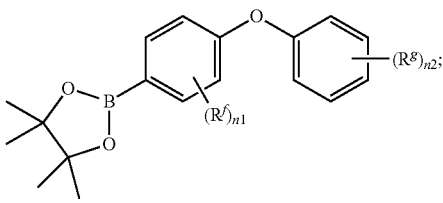

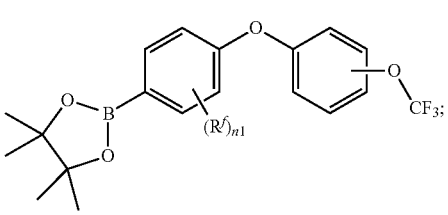

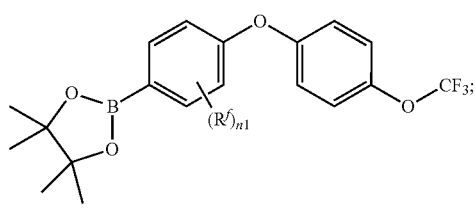

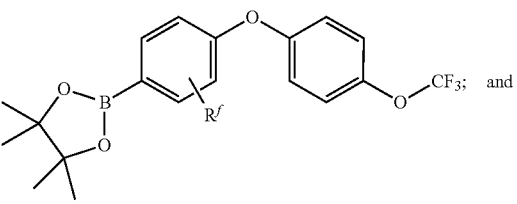

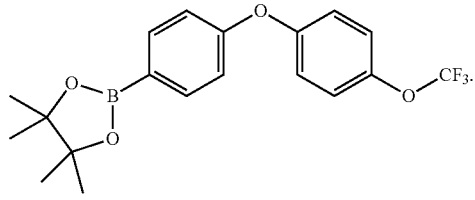

The new synthetic methods presented herein take advantage of the known conversion of 4-chloro quinolines to their respective 4-(1H)-quinolones and demonstrates a previously unknown selective Suzuki reaction. Taken together in one embodiment it comprises, as depicted in Scheme 1, a new method for the synthesis of 3-aryl functionalized 4-(1H)-quinolones, including ELQ-300 and ELQ-316, that is amenable to industrial scale production.

Scheme 1.

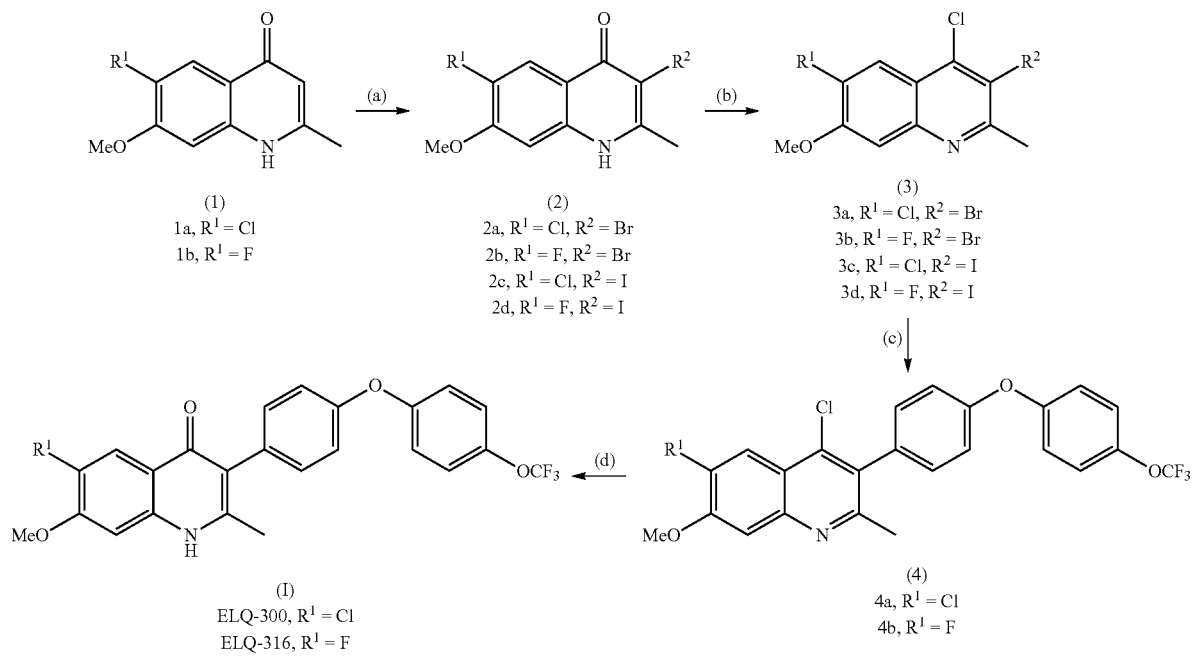

(a) Br$_2$ or I$_2$, NaHCO$_3$, MeOH, rt;
(b) POCl$_3$, CH$_2$Cl$_2$, rt;
(c) 4,4,5,5-tetramethyl-2-(4-(4-(trifluoromethoxy)phenoxy)phenyl)-1,3,2-dioxaborolane, Pd(dppf)Cl$_2$, K$_2$CO$_3$, H$_2$O, DMF, 85° C.;
(d) CsOAc, glacial AcOH.

As such, provided is a method of preparation of a compound of Formula (I):

(I)

wherein R$^1$ is selected from the group of Cl and F;
the method comprising the steps of:
e) reacting a compound of Formula (1):

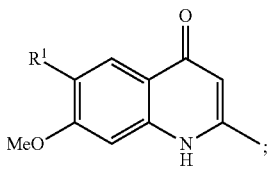

wherein R$^1$ is selected from the group of F and Cl, with iodine or bromine to produce a compound of Formula (2):

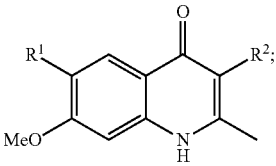

wherein R$^1$ is selected from the group of Cl and F; and R$^2$ is selected from the group of Br and I;

f) reacting the compound of Formula (2) with phosphoryl chloride and dichloromethane to produce a compound of Formula (3):

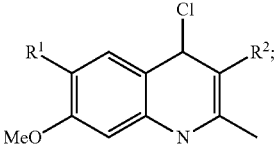

wherein R$^1$ is selected from the group of Cl and F, and R$^2$ is selected from Br and I;

g) reacting the compound of Formula (3) with 4,4,5,5-tetramethyl-2-(4-(4-(trifluoromethoxy)phenoxy)phenyl)-1,3,2-dioxaborolane in the presence of a [1,1'-Bis(diphenylphosphino)ferrocene]dichloropalladium(II) catalyst to produce a compound of Formula (4):

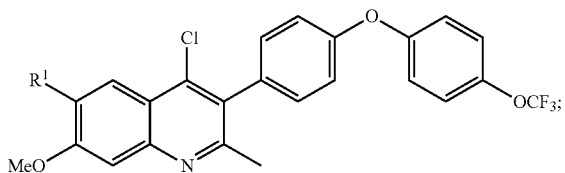

wherein $R^1$ is selected from F and Cl; and h) reacting the compound of Formula (4) with cesium acetate and glacial acetic acid to produce a compound of Formula (I).

Novel Intermediates

Along with the synthetic methods herein, also provided are novel intermediates useful in the preparation of pharmacologically active compounds.

Provided is a compound of the formula:

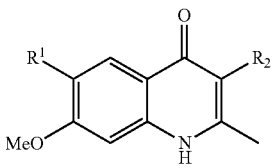

wherein $R_1$ is selected from the group of F and Cl; and $R_2$ is selected from the group of Br and I; with the proviso that, when $R_1$ is Cl, $R_2$ is not Br.

Provided is a compound of the formula:

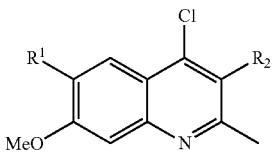

wherein $R_1$ is selected from F and Cl; and $R_2$ is selected from Br and I.

Also provided herein is a compound of the formula:

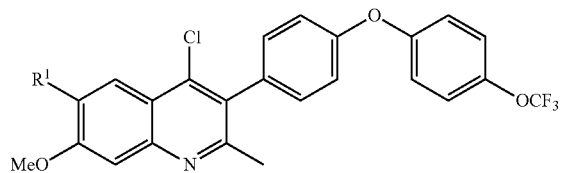

wherein $R_1$ is selected from F and Cl.

Synthesis

Quinolones 1a (6-chloro-7-methoxy-2-methylquinolin-4 (1H)-one) and 1b (6-fluoro-7-methoxy-2-methylquinolin-4 (1H)-one) (prepared as previously described, Nilsen et al. J. Med. Chem. 2014, 57(9), 3818-3834) were reacted with bromine or iodine with sodium bicarbonate in methanol at room temperature to obtain quinolones 2a-2d. Both bromine and iodine reactions provided nearly quantitative yield. However, the bromine reactions occurred overnight, while the iodine reactions required 14 days to reach completion.

Quinolones 2a-2d were reacted with phosphorus oxychloride in dichloromethane at reflux temperature for 72 hours to give 4-chloro quinolones 3a (3-bromo-4,6-dichloro-7-methoxy-2-methylquinoline), 3b (3-bromo-4-chloro-6-fluoro-7-methoxy-2-methylquinoline), 3c (4,6-dichloro-3-iodo-7-methoxy-2-methylquinoline), and 3d (4-chloro-6-fluoro-3-iodo-7-methoxy-2-methylquinoline). These reactions did not provide difficult-to-separate byproducts, and yields were >90%. In contrast, the previous method, reaction of quinolones 2a (3-bromo-6-chloro-7-methoxy-2-methylquinolin-4(1H)-one), 2b (3-bromo-6-fluoro-7-methoxy-2-methylquinolin-4(1H)-one), 2c (6-chloro-3-iodo-7-methoxy-2-methylquinolin-4(1H)-one), and 2d (6-fluoro-3-iodo-7-methoxy-2-methylquinolin-4(1H)-one) with ethyl iodide, resulted in some N-ethylation (a difficult-to-separate byproduct), and yields were ~75%.

4-Chloro quinolines 3a-3d were coupled to 4,4,5,5-tetramethyl-2-(4-(4-(trifluoromethoxy)phenoxy)phenyl)-1,3,2-dioxaborolane via a Suzuki reaction using [1,1'-bis(diphenylphosphino)ferrocene] dichloropalladium (II) and aqueous potassium carbonate in dimethylformamide for 12 hours at 85° C. to provide 4-chloro quinolones 4a (4,6-dichloro-7-methoxy-2-methyl-3-(4-(4-(trifluoromethoxy) phenoxy)phenyl)quinoline) and 4b (4-chloro-6-fluoro-7-methoxy-2-methyl-3-(4-(4-(trifluoromethoxy)phenoxy) phenyl)quinoline). The boronic ester selectively coupled to the 3-position with no observed 4-position coupling or reduction of the 4-chloro moiety.

Finally, 4-chloro quinolones 4a and 4b were converted back to the corresponding 4-(1H)-quinolones ELQ-300 and ELQ-331 using cesium acetate in glacial acetic acid in a sealed tube at 150° C. for 2 hours. These reactions provided the final 4-(1H)-quinolones in nearly quantitative yield. These conditions are much milder and require substantially less reaction time than those required to deprotect 4-O-ethylquinolones, hydrobromic acid in acetic acid at 90° C. for 48 hours, which can result in cleavage of the methyl ether moiety at the 7-position.

Scheme 2.

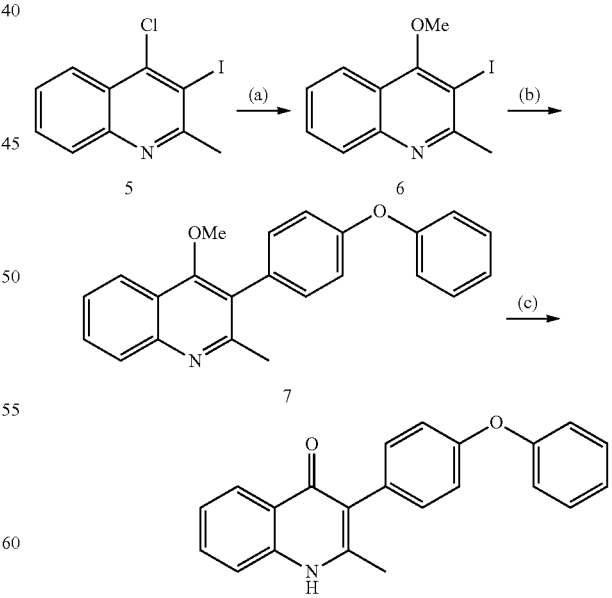

(a) NaOMe, MeOH;
(b) (4-phenoxyphenyl)boronic acid, Pd(PPh$_3$)$_4$, K$_2$CO$_3$, H$_2$O, DMF, 85° C.; BBr$_3$.

4-Chloroquinoline 5 (4-chloro-3-iodo-2-methylquinoline), an analog of key intermediates 3a-3d, occurs in our work (Nilsen et al. J. Med. Chem. 2014, 57(9), 3818-3834). However, it appears in the context of an alternative method for making quinolone 4-O-alkyl ethers, and does not involve the use of a selective Suzuki reaction in the presence of the 4-chloro moiety. Overall, the chemistry is very different (Scheme 2).

Materials and Methods

Unless otherwise stated all chemicals and reagents were from Sigma-Aldrich Chemical Company in St. Louis, MO (USA) or Combi-Blocks in San Diego (Calif.) and were used as received. The quinolone 1 was synthesized according to Nilsen et al, J. Med Chem. 2014.

Melting points were obtained in the Optimelt Automated Melting point system from Stanford Research Systems, Sunnyvale, CA (USA). Analytical TLC utilized Merck 60F-254 250 micron precoated silica gel plates and spots were visualized under 254 UV light. GC-MS was obtained using an Agilent Technologies 7890B gas chromatography machine (30 m, DBS column set at either 100° C. or 200° C. for 2 min, then at 30° C./min to 300° C. with inlet temperature set at 250° C.) with an Agilent Technologies 5977A mass-selective detector operating at 70 eV. Flash column chromatographies were performed with the TLC plate measurement method implemented by the machine, using an automated flash chromatography Isolera One from Biotage, Uppsala, Sweden. $^1$H-NMR spectra were obtained using a Bruker AMX-400 NMR spectrometer operating at 400.14 MHz in $CDCl_3$ or DMSO-de. The NMR raw data were analyzed using the iNMR Spectrum Analyst software. $^1$H Chemical shifts were reported in parts million units (ppm), (δ) relative to either tetramethylsilane (TMS) as internal standard or the residual proton at 7.26 ppm in the deuterated $CDCl_3$. J coupling constants values are in hertz (Hz). Decoupled $^{19}$F operating at 376 MHz was also obtained for compounds containing fluorine. HPLC analyses were performed using an HP1100 with detection at 254 nm using a Phenomenex Luna C18 reverse phase column (5 mm, 50×2 mm i.d.) at 40° C. High resolution mass spectra were collected using a high-resolution (30,000) Thermo LTQ-Orbitrap Discovery hybrid mass spectrometry instrument (San Jose, CA) equipped with an electrospray ionization source operating in the positive or negative mode. The Orbitrap was externally calibrated prior to data acquisition allowing accurate mass measurements for [M+H]$^+$ ions to be obtained to within 4 ppm.

3-bromo-6-chloro-7-methoxy-2-methylquinolin-4(1H)-one (2a): To a stirred mixture of quinolone 1 (28.0 g, 126.3 mmol) and $NaHCO_3$ (15 g, 0.179 mmol) in methanol (300 ml) was added bromine (20.3 g, 126.9 mmol), dropwise to control the brisk evolution of $CO_2$. After the addition was completed, the mixture was stirred vigorously until no more gas bubbles were observed (approximately 30 minutes). Then water (200 ml) was added, stirred for another 0.5 hour, filtered, washed with dilute hydrobromic acid (5%, 50 ml), water (3×100 ml), methanol (2×100 ml), and acetone (100 ml) and air dried to give 2a (36.6 g, 97% yield) as grey solid. NMR.

3-bromo-4,6-dichloro-7-methoxy-2-methylquinoline (3a): A stirred mixture of quinolone 2a (20.6 g, 68 mmol), $POCl_3$ (42 g, 267 mmol) and methylene chloride (130 ml) were heated at reflux for 3 days. The mixture was kept at ambient temperature overnight, filtered and washed with methylene chloride and air-dried to give 3a (19.0 g, 87% yield). This product is pure enough by GC-MS and TLC for further reaction. GC-MS shows one peak with M+ $^1$H-NMR (400 MHz; $CDCl_3$). The product can be recrystallized in DMF/acetone to give white needles.

6-chloro-3-iodo-7-methoxy-2-methylquinolin-4(1H)-one (2c): To a stirred methanol (2.5 L) was added in sequence, and at such a rate as to maintain good stirring, quinolone 1 (201 g, 0.90 moles), $NaHCO_3$ (112 g 1.33 mol), and iodine (350 g, 1.38 moles). After one day stirring at room temperature it was estimated that about 90% iodination had been reached, and after 2 weeks the iodination was nearly completed (>96%). Stirring was then stopped, the precipitate decanted, and the supernatant removed. Water (2 l) was added and the mixture was stirred for 30 minutes, filtered washed with water (1 l), methanol (300 ml), and acetone (300 ml), and air dried to give 2c (310 g, 99% yield) as a grey solid. GC-MS shows one peak with M+ $^1$H-NMR (400 MHz; $CDCl_3$).

4,6-dichloro-3-iodo-7-methoxy-2-methylquinoline (3c): A mixture of quinolone 2c (10.0 g, 28.6 mmol), $POCl_3$ (14 ml, 146 mmol) and methylene chloride (100 ml) was refluxed for 3 days. The solid product was filtered and washed with methylene chloride, and air-dried to give 3c (9.8 g, 93%) as a whitish powder. This product is pure enough by GC-MS and TLC for further reaction. GC-MS shows one peak with M+

Recrystallization from DMF (100 ml) gave 3c (5.6 g, 53% yield) as white crystals.

Due to very poor solubility in all NMR solvents, only a poorly resolved spectrum was obtained by $^1$H-NMR (400 MHz; DMSO-d$_6$): δ 8.20 (s, 1H), 7.59 (s, 1H), 4.04 (s, 3H) 2.92 (s, 3H).

4,6-dichloro-7-methoxy-2-methyl-3-(4-(4-(trifluoromethoxy)phenoxy)phenyl)quinoline (4a). Quinoline 3c (1.10 g, 3.0 mmol), 4,4,5,5-tetramethyl-2-(4-(4-(trifluoromethoxy)phenoxy)phenyl)-1,3,2-dioxaborolane (3.6 mmol), 2M $K_2CO_3$ (3 ml, 6 mmol) and Pd(dppf)Cl$_2$ (110 mg, 0.15 mmol) in DMF (70 ml) were used. After 16 hours at 80° C. GC-MS showed no more 3 remained. The reaction mixture was cooled, filtered through Celite® diatomaceous earth and the filtrate concentrated to dryness by roto evaporation under vacuum. The resulting residue was stirred with methylene chloride (200 ml) for 60 minutes, filtered through Celite® diatomaceous earth and the filtrate concentrated to dryness to afford 801 mg of a reddish solid poorly soluble in methylene chloride. The product was purified by crystallization in hexane/chloroform to give 415 mg of 4a as a white powder. An additional 210 mg of 4a was obtained from the mother liquor. The combined product gave 8 (625 mg, 46% yield) as a white powder. GC-MS. $^1$H-NMR (400 MHz; $CDCl_3$).

6-Chloro-7-methoxy-2-methyl-3-(4-(4-(trifluoromethoxy)-phenoxy)phenyl) quinoline-4(1H)-one (ELQ-300). Quinoline 4a (0.152 g, 0.308 mmol) was combined with cesium acetate (15 eq, 0.00462 mol, 4.62 mL of a 1 M solution in glacial acetic acid) and glacial acetic acid (4 mL). This mixture was stirred and heated at 150° C. in a sealed Carius vessel for 2 hours, whereupon TLC indicated that no starting material remained. After cooling, the reaction mixture was poured into 60 mL water. After standing briefly, the resulting precipitate was vacuum filtered, rinsing with water followed by 3 mL acetone. Air drying afforded the desired product ELQ-300 as an off-white solid (0.113 g, 77% yield). $^1$H-NMR (400 MHz; DMSO-d$_6$): δ 11.66 (s, 1H), 8.00 (s, 1H), 7.43-7.40 (m, 2H), 7.30-7.26 (m, 2H), 7.18-7.15 (m, 2H), 7.10-7.04 (m, 3H), 3.97 (s, 3H), 2.24 (s, 3H).

The compounds and pharmaceutical compositions disclosed herein can be used for inhibiting or preventing parasitic diseases. For example, human or animal parasitic diseases include malaria, toxoplasmosis, amebiasis, giardiasis, leishmaniasis, trypanosomiasis, and coccidiosis, caused by organisms such as *Toxoplasma* sp., *Eimeria* sp., *Babesia bovis, Theileria* sp., and also includes infections by helminths, such as *ascaris*, schistosomes and filarial worms. The compounds and compositions are also effective in the inhibition of fungal pathogens including *Pneumocystis carinii, Aspergillus fumigatus*, and others.

In particular embodiments, the parasitic diseases may be caused by parasites that cause malaria. Particular species of parasites that are included within this group include all species that are capable of causing human or animal infection. Illustrative species include *Plasmodium falciparum, Plasmodium vivax, Plasmodium ovale, Plasmodium knowlesi*, and *Plasmodium malariae*. The compounds and compositions disclosed herein are particularly useful for inhibiting drug-resistant malaria such as chloroquine-resistant malaria or multidrug-resistant malaria that is caused by organisms harboring resistance to chloroquine, quinine, mefloquine, pyrimethamine, dapsone, and/or atovaquone.

Toxoplasmosis is caused by a sporozoan parasite of the Apicomplexa called *Toxoplasma gondii*. It a common tissue parasite of humans and animals. Most of the infections appear to be asymptomatic (90%), however toxoplasmosis poses a serious health risk for immuno-compromised individuals, such as organ transplant recipients, cancer and AIDS patients, and the unborn children of infected mothers. The compounds disclosed herein may be used alone to treat toxoplasmosis or they may be co-administered with "antifolates" such as sulfonamides, pyrimethamine, tirmethoprim, biguanides and/or atovaquone.

Definitions

The term "alkyl" refers to a straight or branched hydrocarbon. For example, an alkyl group can 1 to 6 carbon atoms (i.e., $C_1$-$C_6$ alkyl). Examples of suitable alkyl groups include, but are not limited to, methyl (Me, —$CH_3$), ethyl (Et, —$CH_2CH_3$), 1-propyl (n-Pr, n-propyl, —$CH_2CH_2CH_3$), 2-propyl (i-Pr, i-propyl, —$CH(CH_3)_2$), 1-butyl (n-Bu, n-butyl, —$CH_2CH_2CH_2CH_3$), 2-methyl-1-propyl (i-Bu, i-butyl, —$CH_2CH(CH_3)_2$), 2-butyl (s-Bu, s-butyl, —$CH(CH_3)CH_2CH_3$), 2-methyl-2-propyl (t-Bu, t-butyl, —$C(CH_3)_3$), 1-pentyl (n-pentyl, —$CH_2CH_2CH_2CH_2CH_3$), 2-pentyl (—$CH(CH_3)CH_2CH_2CH_3$), 3-pentyl (—$CH(CH_2CH_3)_2$), 2-methyl-2-butyl (—$C(CH_3)_2CH_2CH_3$), 3-methyl-2-butyl (—$CH(CH_3)CH(CH_3)_2$), 3-methyl-1-butyl (—$CH_2CH_2CH(CH_3)_2$), 2-methyl-1-butyl (—$CH_2CH(CH_3)CH_2CH_3$), 1-hexyl (—$CH_2CH_2CH_2CH_2CH_2CH_3$), 2-hexyl (—$CH(CH_3)CH_2CH_2CH_2CH_3$), 3-hexyl (—$CH(CH_2CH_3)(CH_2CH_2CH_3)$), and 2-methyl-2-pentyl (—$C(CH_3)_2CH_2CH_2CH_3$) groups.

The term "alkoxy" refers to a group having the formula —O-alkyl, in which an alkyl group, as defined above, is attached to the parent molecule via an oxygen atom. The alkyl portion of an alkoxy group can have 1 to 6 carbon atoms (i.e., $C_1$-$C_6$ alkoxy). Examples of suitable alkoxy groups include, but are not limited to, methoxy (—O—$CH_3$ or —OMe), ethoxy (—$OCH_2CH_3$ or —OEt), t-butoxy (—O—$C(CH_3)_3$ or —OtBu) and the like.

The term "haloalkyl" refers to an alkyl group, as defined above, in which one or more hydrogen atoms of the alkyl group is replaced with a halogen atom. The alkyl portion of a haloalkyl group can have, for instance, 1 to 3 carbon atoms (i.e., $C_1$-$C_3$ haloalkyl). Examples of suitable haloalkyl groups include halofluoro groups, such as, but are not limited to, —$CF_3$, —$CHF_2$, —$CFH_2$, —$CH_2CF_3$, and the like. The term "haloalkoxy" refers to a haloalkyl group bridged through an oxygen atom, such as seen in a trifluoromethoxy, 2,2,2-trifluoroethoxy, and 1,1-difluoroethoxy groups.

The term "aryl" refers to an aromatic hydrocarbon radical derived by the removal of one hydrogen atom from a single carbon atom of a parent aromatic ring system. For example, an aryl group can have 6 to 20 carbon atoms, 6 to 14 carbon atoms, or 6 to 10 carbon atoms. Typical aryl groups include, but are not limited to, radicals derived from benzene (e.g., phenyl), benzyl (—$CH_2$-phenyl), substituted benzene, naphthalene, anthracene, biphenyl, and the like. In some embodiments herein, aryl groups include phenyl, benzyl, and naphthyl groups. In other embodiments, aryl refers to phenyl and benzyl substituents.

The term "heteroaryl" refers to an aromatic heterocyclyl having at least one heteroatom in the ring. Non-limiting examples of suitable heteroatoms which can be included in the aromatic ring include oxygen, sulfur, and nitrogen. Non-limiting examples of heteroaryl rings include aromatic rings pyridinyl, pyrrolyl, oxazolyl, indolyl, isoindolyl, purinyl, furanyl, thienyl, benzofuranyl, benzothiophenyl, carbazolyl, imidazolyl, thiazolyl, isoxazolyl, pyrazolyl, isothiazolyl, quinolyl, isoquinolyl, pyridazyl, pyrimidyl, pyrazyl, etc.

The term "pharmaceutically acceptable salt" or "therapeutically acceptable salt" refer to a salt form of a compound of Formula (I) which is, within the scope of sound medical evaluation, suitable for use in contact with the tissues and organs of humans and/or animals such that any resulting toxicity, irritation, allergic response, and the like and are commensurate with a reasonable benefit/risk ratio.

An additional step may be included to each of the processes herein that result in a compound of Formula (I) to produce a pharmaceutically acceptable salt of a compound of Formula (I). This may include, for example, salts with inorganic acids and salts with an organic acid. Examples of salts may include hydrochloride, phosphate, diphosphate, hydrobromide, sulfate, sulfinate, nitrate, malate, maleate, fumarate, tartrate, succinate, citrate, acetate, lactate, methanesulfonate (mesylate), benzenesuflonate (besylate), p-toluenesulfonate (tosylate), 2-hydroxyethylsulfonate, benzoate, salicylate, stearate, and alkanoate (such as acetate, HOOC—$(CH_2)_n$—COOH where n is 0-4). In addition, if the compounds described herein are obtained as an acid addition salt, the free base can be obtained by basifying a solution of the acid salt. Conversely, if the product is a free base, an addition salt, particularly a pharmaceutically acceptable addition salt, may be produced by dissolving the free base in a suitable organic solvent and treating the solution with an acid, in accordance with conventional procedures for preparing acid addition salts from base compounds. Those skilled in the art will recognize various synthetic methodologies that may be used to prepare nontoxic pharmaceutically acceptable addition salts. These salts may be prepared by standard procedures, for example by reaction of the free acid with a suitable organic or inorganic base. Any chemical isotopic compound recited in this specification may alternatively be administered as a pharmaceutically acceptable salt thereof. Pharmaceutically acceptable salts are also inclusive of the free acid, base, and zwitterionic forms of the disclosed isotopic compounds. Descriptions of exemplary pharmaceutically acceptable salts can be found in Stahl and Wermuth, Eds., *Handbook of Pharmaceutical Salts; Properties, Selection and Use*, Wiley VCH (2008). When the isotopic compounds disclosed herein include an acidic group such as a carboxy group, then suitable pharmaceutically acceptable cation pairs for the carboxy group are well known to those skilled in the art and include, without limitation, alkaline, alkaline earth, ammonium, and quaternary ammonium cations. Such salts are known to those of skill in the art. Similarly when the isotopic compounds disclosed herein include a basic group such as an amino group, then suitable pharmaceutically acceptable anion pairs for the basic group are similarly well known and include halide, hydroxide, perhalate, halite, hypohalite, sulfate, sulfite, phosphate, phosphite, nitrate, nitrite, and others known to those of skill in the art. For additional examples of pharmacologically acceptable salts, see Berge et al, *J. Pharm. Sci.* 66, 1 (1977).

What is claimed:

1. A method of preparation of a compound of the Formula (A):

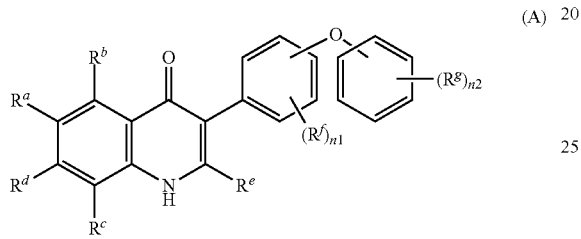

wherein:

$R^a$, $R^b$, $R^c$, and $R^d$ are each independently selected from the group of H, halogen, $C_1$-$C_6$ alkyl, $C_1$-$C_6$ alkoxy, $C_1$-$C_3$ haloalkyl, aryl, nitro, cyano, amino, amido, acyl, carboxyl, substituted carboxyl, and —$SO_2R^h$;

$R^h$ is selected from the group of H, $C_1$-$C_6$ alkyl, amino, or $C_1$-$C_3$ haloalkyl;

$R^e$ is selected from the group of methyl, $C_1$-$C_3$ haloalkyl, and heteroaryl;

$R^f$ and $R^g$ are independently selected from the group of H, $C_1$-$C_6$ alkyl, $C_1$-$C_6$ alkoxy, $C_1$-$C_3$ haloalkyl, $C_1$-$C_3$ haloalkoxy, methylsulfonyl, and halogen;

n1 is integer selected from the group of 0, 1, 2, 3, 4, and 5; and n2 is integer selected from the group of 0, 1, 2, 3, 4, and 5;

the method comprising the steps of:

a) reacting a compound of Formula (1):

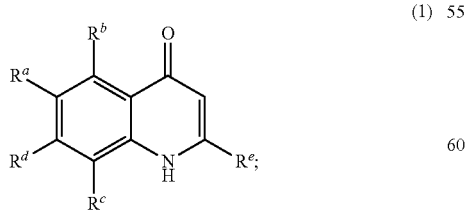

wherein variables $R^a$, $R^b$, $R^c$, $R^d$, and $R^e$ are as defined for Formula (A), above, with iodine or bromine to produce a compound of Formula (2):

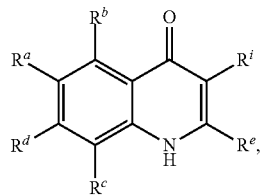

wherein variables $R^a$, $R^b$, $R^c$, $R^d$, and $R^e$ are as defined for Formula (A), above, and $R^i$ is selected from the group of Br and I;

b) reacting the compound of Formula (2) with phosphoryl chloride and dichloromethane to produce a compound of Formula (3):

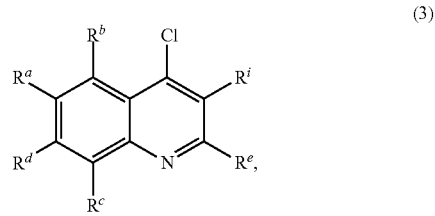

wherein variables $R^a$, $R^b$, $R^c$, $R^d$, and $R^e$ are as defined for Formula (A), above, $R^i$ is selected from Br and I;

c) reacting the compound of Formula (3) with an optionally substituted 4,4,5,5-tetramethyl-2-(4-phenoxyphenyl)-1,3,2-dioxaborolane compound of the formula:

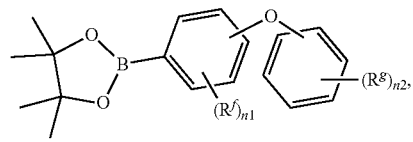

wherein $R^f$, $R^g$, n1, and n2 are as defined for Formula (A), above; in the presence of a palladium catalyst to produce a compound of Formula (4):

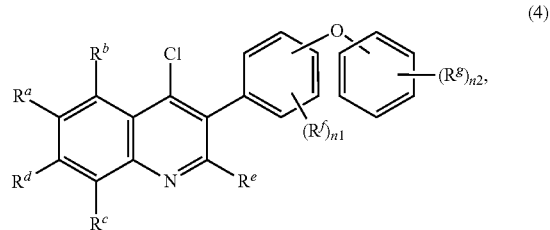

wherein variables $R^a$, $R^b$, $R^c$, $R^d$, $R^e$, $R^f$, $R^g$, n1, and n2 are as defined for Formula (A), above; and d) reacting the compound of Formula (4) with cesium acetate and glacial acetic acid to produce a compound of Formula (A).

2. The method of claim 1, wherein the compound of Formula (A) is a compound of Formula (A1):

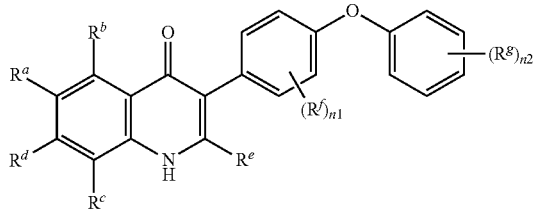

(A1)

wherein $R^a$, $R^b$, $R^c$, $R^d$, $R^e$, $R^f$, $R^g$, n1, and n2 are as defined in claim 1.

3. The method of claim 1, wherein the compound of Formula (A) is a compound of Formula (A2):

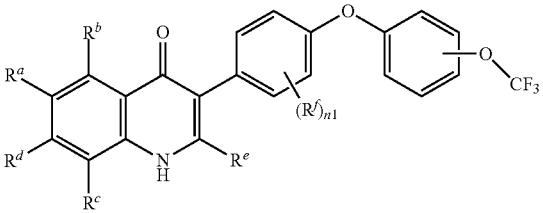

(A2)

wherein variables $R^a$, $R^b$, $R^c$, $R^d$, $R^e$, $R^f$, and n1 are as defined in claim 1.

4. The method of claim 1, wherein the compound of Formula (A) is a compound of Formula (A3):

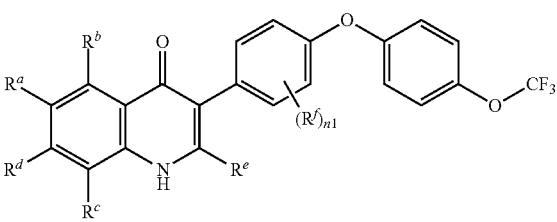

(A3)

wherein variables $R^a$, $R^b$, $R^c$, $R^d$, $R^e$, $R^f$, and n1 are as defined in claim 1.

5. The method of claim 1, wherein the compound of Formula (A) is a compound of Formula (A4):

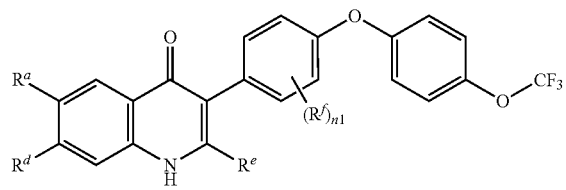

(A4)

wherein variables $R^a$, $R^d$, $R^e$, $R^f$, and n1 are as defined in claim 1.

6. The method of claim 1, wherein $R^e$ is methyl.
7. The method of claim 1, wherein, $R^b$ is hydrogen.
8. The method of claim 7, wherein, $R^c$ is hydrogen.

9. The method of claim 1, wherein the optionally substituted 4,4,5,5-tetramethyl-2-(4-phenoxyphenyl)-1,3,2-dioxaborolane compound is a compound of the formula:

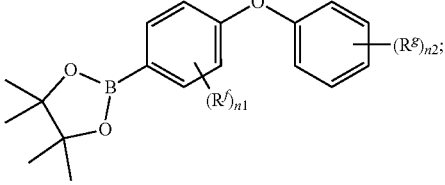

wherein $R^f$, $R^g$, n1, and n2 are as defined in claim 1.

10. The method of claim 1, wherein the optionally substituted 4,4,5,5-tetramethyl-2-(4-phenoxyphenyl)-1,3,2-dioxaborolane compound is a compound of the formula:

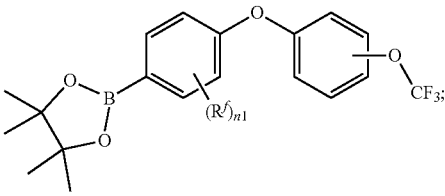

wherein $R^f$ and n1 are as defined in claim 1.

11. The method of claim 1, wherein the optionally substituted 4,4,5,5-tetramethyl-2-(4-phenoxyphenyl)-1,3,2-dioxaborolane compound is a compound of the formula:

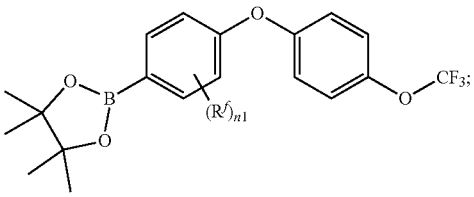

wherein $R^f$ and n1 are as defined in claim 1.

12. The method of claim 1, wherein the optionally substituted 4,4,5,5-tetramethyl-2-(4-phenoxyphenyl)-1,3,2-dioxaborolane compound is a compound of the formula:

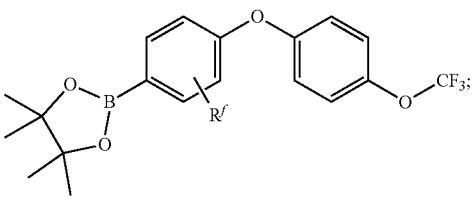

wherein $R^f$ is as defined in claim 1.

13. The method of claim 12, wherein $R^f$ is hydrogen.

14. A method of preparation of a compound of Formula (I):

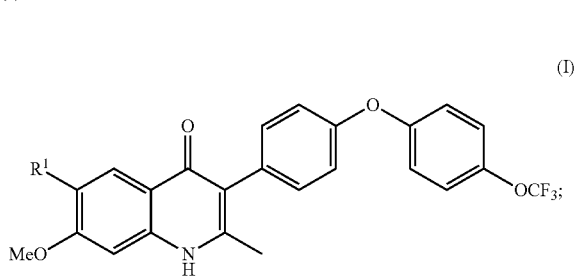
(I)

wherein $R^1$ is selected from the group of Cl and F;
the method comprising the steps of:
a) reacting a compound of Formula (1):

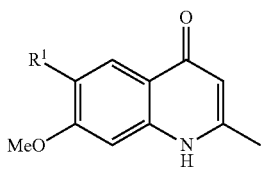
(1)

wherein $R^1$ is selected from the group of F and Cl, with iodine or bromine to produce a compound of Formula (2):

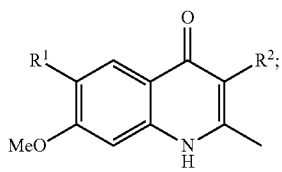
(2)

wherein $R^1$ is selected from the group of Cl and F; and $R^2$ is selected from the group of Br and I;
b) reacting the compound of Formula (2) with phosphoryl chloride and dichloromethane to produce a compound of Formula (3):

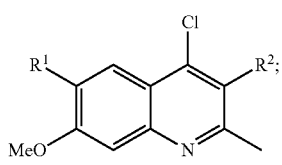
(3)

wherein $R^1$ is selected from the group of Cl and F, and $R^2$ is selected from Br and I;
c) reacting the compound of Formula (3) with 4,4,5,5-tetramethyl-2-(4-(4-(trifluoromethoxy)phenoxy)phenyl)-1,3,2-dioxaborolane in the presence of a [1,1'-Bis(diphenylphosphino)ferrocene]dichloropalladium(II) catalyst to produce a compound of Formula (4):

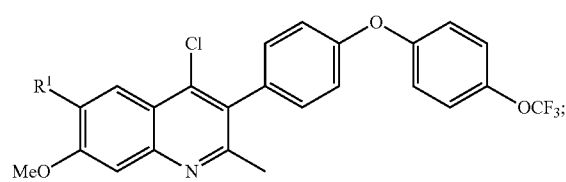
(4)

wherein $R^1$ is selected from F and Cl; and
d) reacting the compound of Formula (4) with cesium acetate and glacial acetic acid to produce a compound of Formula (I).

15. A method of preparation of a compound of Formula (I):

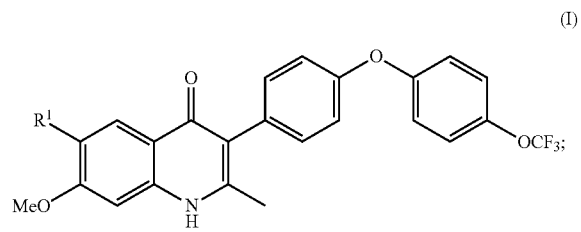
(I)

wherein $R^1$ is selected from the group of Cl and F;
the method comprising reacting a compound of Formula (4):

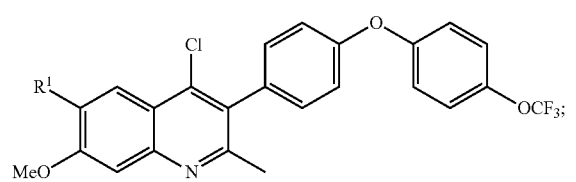
(4)

wherein $R^1$ is selected from F and Cl; with cesium acetate and glacial acetic acid to produce a compound of Formula (I).

16. The method of claim 15, wherein the compound prepared is ELQ-316:

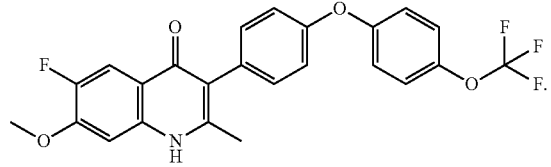

ELQ-316

17. The method of claim 15, wherein the compound prepared is ELQ-300:

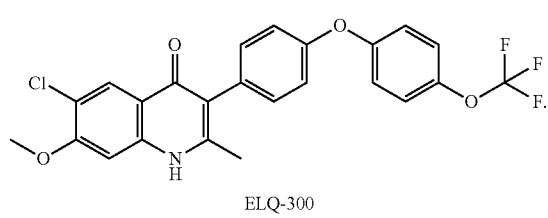 [SMILES: COc1cc2[nH]c(C)c(-c3ccc(Oc4ccc(OC(F)(F)F)cc4)cc3)c(=O)c2cc1F]

ELQ-300

18. A method of preparation of a compound of Formula (4):

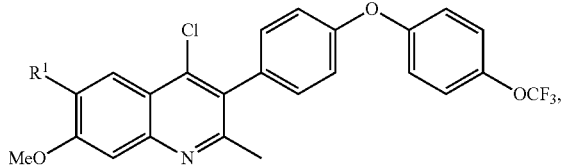
(4)

wherein $R^1$ is selected from F and Cl; the method comprising reacting a compound of Formula (3):

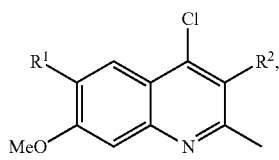
(3)

wherein $R^1$ is selected from the group of Cl and F, and $R^2$ is selected from Br and I; with 4,4,5,5-tetramethyl-2-(4-(4-(trifluoromethoxy)phenoxy)phenyl)-1,3,2-dioxaborolane in the presence of a [1,1'-Bis(diphenylphosphino)ferrocene] dichloropalladium(II) catalyst to produce the compound of Formula (4).

19. The method of claim 18 further providing the step of preparing the compound of Formula (3):

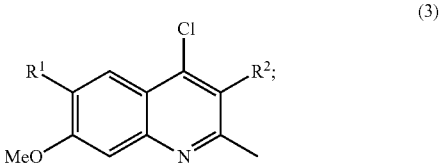
(3)

wherein $R^1$ is selected from the group of Cl and F, and $R^2$ is selected from Br and I;
the step comprising reacting a compound of Formula (2):

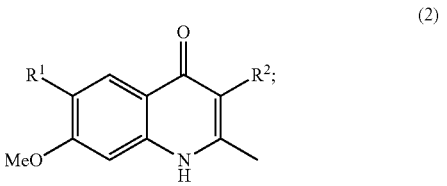
(2)

wherein $R^1$ is selected from the group of Cl and F; and $R^2$ is selected from the group of Br and I;
with phosphoryl chloride and dichloromethane to produce the compound of Formula (3).

20. The method of claim 1, wherein the palladium catalyst is a [1,1'-Bis(diphenyl phosphino)ferrocene] dichloropalladium(II) catalyst (Pd(dppf)Cl$_2$).

* * * * *